United States Patent
Hong

(10) Patent No.: US 12,019,792 B2
(45) Date of Patent: Jun. 25, 2024

(54) ELECTRONIC DEVICE FOR PROVIDING ALTERNATIVE CONTENT AND OPERATING METHOD THEREOF

(71) Applicant: Samsung Electronics Co., Ltd., Suwon-si (KR)

(72) Inventor: Minho Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/957,765

(22) Filed: Sep. 30, 2022

(65) Prior Publication Data

US 2023/0024903 A1 Jan. 26, 2023

Related U.S. Application Data

(63) Continuation of application No. PCT/KR2022/001876, filed on Feb. 8, 2022.

(30) Foreign Application Priority Data

Mar. 15, 2021 (KR) .................. 10-2021-0033569

(51) Int. Cl.
   *G06F 3/01* (2006.01)
(52) U.S. Cl.
   CPC .................................. *G06F 3/011* (2013.01)
(58) Field of Classification Search
   CPC .. G06F 16/903; G06F 16/9038; G06F 16/904;
   G06F 16/957; G06F 3/011; G06F 3/013;
   G06F 3/016; G06F 3/14; G06F 3/16;
   G06F 3/038; H04L 12/1813; H04L 47/24;
   H04L 67/303; H04W 4/18; H04N 21/233;
   H04N 21/4722; H04M 1/724
   See application file for complete search history.

(56) References Cited

U.S. PATENT DOCUMENTS

| 10,680,995 | B1* | 6/2020 | Hinkle | H04L 12/1813 |
| 10,714,074 | B2 | 7/2020 | Liang et al. | |
| 10,931,999 | B1* | 2/2021 | Jobanputra | H04N 21/233 |
| 2014/0040445 | A1* | 2/2014 | Beckert | H04L 67/303 |
| | | | | 709/223 |
| 2014/0300535 | A1* | 10/2014 | Kim | G06F 3/013 |
| | | | | 345/156 |
| 2015/0153827 | A1* | 6/2015 | Yun | G06F 3/038 |
| | | | | 345/156 |

(Continued)

FOREIGN PATENT DOCUMENTS

| JP | 2006-134178 A | 5/2006 |
| JP | 4518553 B2 | 8/2010 |

(Continued)

*Primary Examiner* — Richard J Hong
(74) *Attorney, Agent, or Firm* — Jefferson IP Law, LLP

(57) ABSTRACT

An electronic device is provided. The electronic device includes a memory configured to store computer-executable instructions, and a processor configured to execute the instructions by accessing the memory, to, when a content switching event is detected in the electronic device, identify content information on a first type of content that is output from the electronic device, retrieve a second type of content related to the first type of content based on the content information, and output the second type of content.

23 Claims, 14 Drawing Sheets

(56) References Cited

U.S. PATENT DOCUMENTS

| | | | |
|---|---|---|---|
| 2016/0381533 A1* | 12/2016 | Fogelson | H04W 4/18 |
| | | | 455/414.1 |
| 2017/0193983 A1 | 7/2017 | May et al. | |
| 2017/0339468 A1* | 11/2017 | Lee | H04N 21/4722 |
| 2018/0204563 A1 | 7/2018 | Liang et al. | |
| 2020/0228452 A1* | 7/2020 | Boss | H04L 47/24 |
| 2020/0301659 A1* | 9/2020 | Kim | H04M 1/724 |

FOREIGN PATENT DOCUMENTS

| | | |
|---|---|---|
| JP | 2016-029540 A | 3/2016 |
| JP | 6279997 B2 | 2/2018 |
| KR | 10-2010-0003577 A | 1/2010 |
| KR | 10-2010-0122137 A | 11/2010 |
| KR | 10-2011-0029485 A | 3/2011 |
| KR | 10-2013-0115016 A | 10/2013 |
| KR | 10-1330528 B1 | 11/2013 |
| KR | 10-2014-0128208 A | 11/2014 |
| KR | 10-2015-0125287 A | 11/2015 |
| KR | 10-2016-0003103 A | 1/2016 |
| KR | 10-2017-0133234 A | 12/2017 |
| KR | 10-2018-0095927 A | 8/2018 |
| KR | 10-2019-0065013 A | 6/2019 |
| KR | 10-2020-0020014 A | 2/2020 |
| KR | 10-2103312 B1 | 4/2020 |
| KR | 10-2180716 B1 | 11/2020 |

* cited by examiner

```
<!DOCTYPE HTML>
<html lang="ko">
<head>                                                                    535
    <meta property="og:url" content="https://d.kbs.co.kr/prepare/insideView?seq=34" />
    <meta property="og:type" content="website" />
    <meta property="og:title" content="Skiing and snowboarding: Many people do both now..." />
    <meta property="og:description" content="The relationship between skiers and snowboarders
might still be a bit icy at times." />
    <meta property="og:image" content="https://s3.ap-northeast-2.amazonaws.com/ops-
kbs-disportal-upload/safetyinside/202102/baf3d70f-9c28-4d87-b367-ed977534aa2d.jpg" />
    <meta name="twitter:card" content="summary">                          539
    <meta name="twitter:url" content="https://d.kbs.co.kr/prepare/insideView?seq=34" />
    <meta name="twitter:title" content="Skiing and snowboarding: Many people do both now..." />
    <meta name="twitter:description" content="The relationship between skiers and snowboarders
might still be a bit icy at times." />
    <meta name="twitter:image"
content="https://s3.ap-northeast-2.amazonaws.com/ops-kbs-disportal-upload/safetyinside
/202102/baf3d70f-9c28-4d87-b367-ed977534aa2d.jpg" />
```

FIG. 5B

```
</div>
    <div class="mainText">
      <div class="videoArea">
        <div id="insideVideo"></div>
        <script> jwplayer.key="wL1VG89d0RJwTeAjmXfOGEztrKfZYekhwBp9bd6UEvskWYWk";
        var playerPop2 = jwplayer("insideVideo");
        playerPop2.setup({                                        610
          playlist: [{
              file: 'https://s3.ap-northeast-2.amazonaws.com/
ops-kbs-disportal-upload/safetyinside/202102/831d12aa-59b1-4df5-a9c6-
04ff56ffb848.mp4',
              image : 'https://s3.ap-northeast-2.amazonaws.com/
ops-kbs-disportal-upload/safetyinside/202102/baf3d70f-9c28-4d87-b367-ed97
7534aa2d.jpg'
          }],
          autostart: true,
          width:1080,
          height:610,
          primary: 'html5',
          mute:false,
          volume: 50,
          logo:false,
        });
        </script>
      </div>
```

FIG. 6A

ELECTRONIC DEVICE FOR PROVIDING ALTERNATIVE CONTENT AND OPERATING METHOD THEREOF

CROSS-REFERENCE TO RELATED APPLICATION(S)

This application is a continuation application, claiming priority under § 365(c), of an International application No. PCT/KR2022/001876, filed on Feb. 8, 2022, which is based on and claims the benefit of a Korean patent application number 10-2021-0033569, filed on Mar. 15, 2021, in the Korean Intellectual Property Office, the disclosure of which is incorporated by reference herein in its entirety.

BACKGROUND

1. Field

The disclosure relates to an electronic device for providing alternative content according to a change in a use environment of a user and an operating method thereof.

2. Description of Related Art

Text-to-speech (TTS) technology converts text content into speech to provide information in speech when it is difficult to view text.

Various voice assistants have been developed to read out text on a screen provided by an electronic device through TTS technology.

The above information is presented as background information only to assist with an understanding of the disclosure. No determination has been made, and no assertion is made, as to whether any of the above might be applicable as prior art with regard to the disclosure.

SUMMARY

Despite the development of TTS technology, hearing speech content that is spoken directly by a person may achieve more natural information delivery than hearing a speech converted from text through TTS technology.

Aspects of the disclosure are to address at least the above-mentioned problems and/or disadvantages and to provide at least the advantages described below. Accordingly, an aspect of the disclosure is to provide an electronic device for providing alternative content according to a change in a use environment of a user.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store computer-executable instructions, and a processor configured to execute the instructions by accessing the memory, wherein the instructions may be configured to control to, when a content switching event is detected in the electronic device, identify content information on a first type of content that is output from the electronic device, retrieve a second type of content related to the first type of content based on the content information, and output the second type of content.

In accordance with another aspect of the disclosure, an operating method of an electronic device is provided. The operating method includes when a content switching event is detected in the electronic device, identifying content information on a first type of content that is output from the electronic device, retrieving a second type of content related to the first type of content based on the content information, and outputting the second type of content.

In accordance with another aspect of the disclosure, a non-transitory recording medium in which a program for controlling an operation of an electronic device is recorded is provided. The program is configured to cause the electronic device to perform, when a content switching event is detected in the electronic device, identifying content information on a first type of content that is output from the electronic device, retrieving a second type of content related to the first type of content based on the content information, and outputting the second type of content.

According to various example embodiments, audio content or video content including audio may be provided instead of text content in a use environment in which it is difficult to concentrate on text, whereby the understanding of the content may increase.

According to various example embodiments, when the use environment returns to one in which the user is able to concentrate on text, the previously provided text content may be provided.

According to various example embodiments, when an electronic device is connected to an external electronic device, an appropriate type of content may be provided seamlessly through the external electronic device.

In addition, various effects directly or indirectly ascertained through the disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 5A and 5B are diagrams to describe content information according to various embodiments of the disclosure;

FIGS. 6A and 6B are diagrams to describe an operation of retrieving a second type of content from content information on a first type of content according to various embodiments of the disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
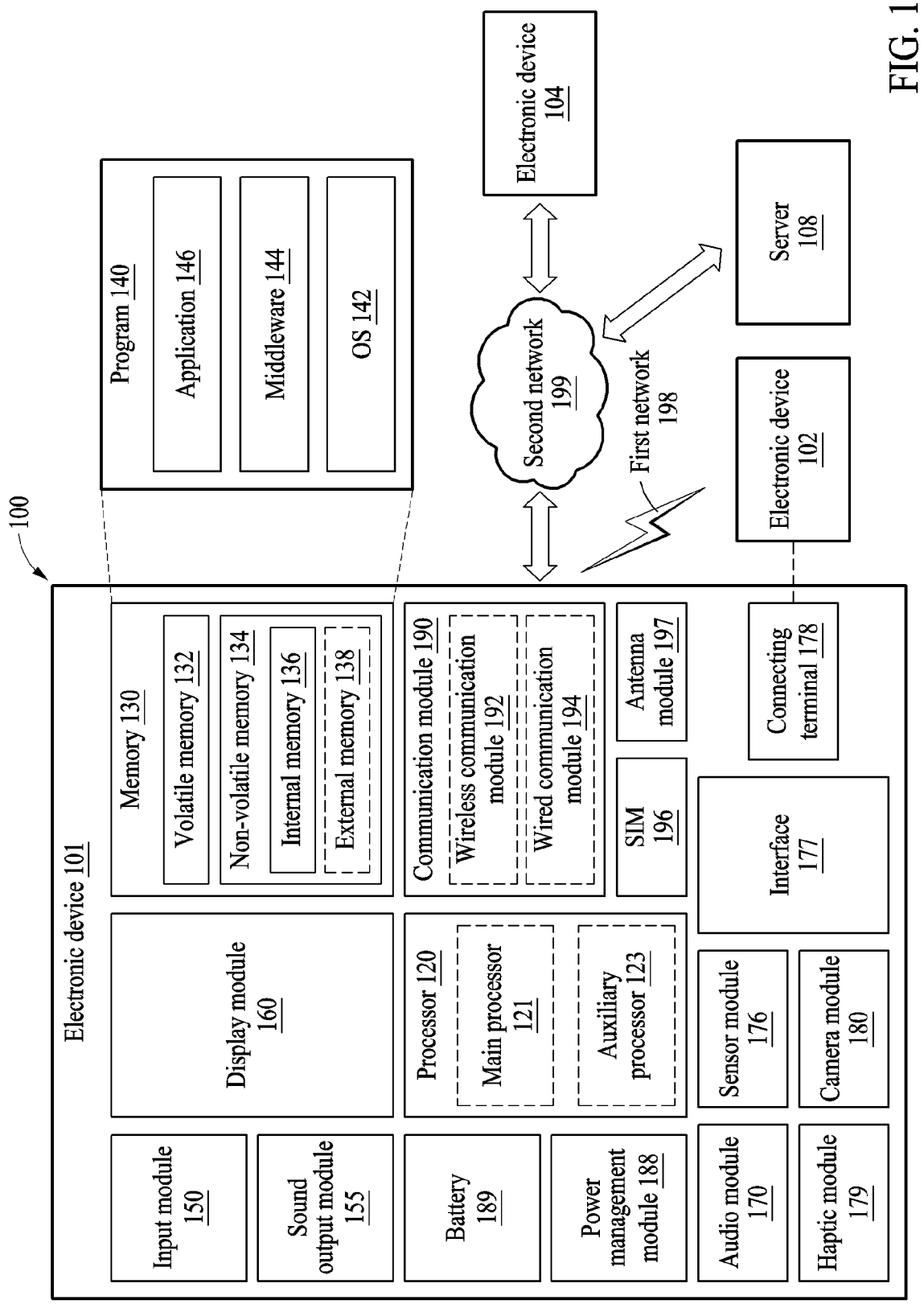
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 or a server 108 via a second network 199 (e.g., a long-range wireless communication network). According to an example embodiment, the electronic device 101 may communicate with the external electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added in the electronic device 101. In some example embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which an artificial intelligence model is executed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the external electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, a Hall sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the external electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the external electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an example embodiment, all or some of operations to be executed by the electronic device 101 may be executed at one or more of the external electronic devices 102 and 104 and the server 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
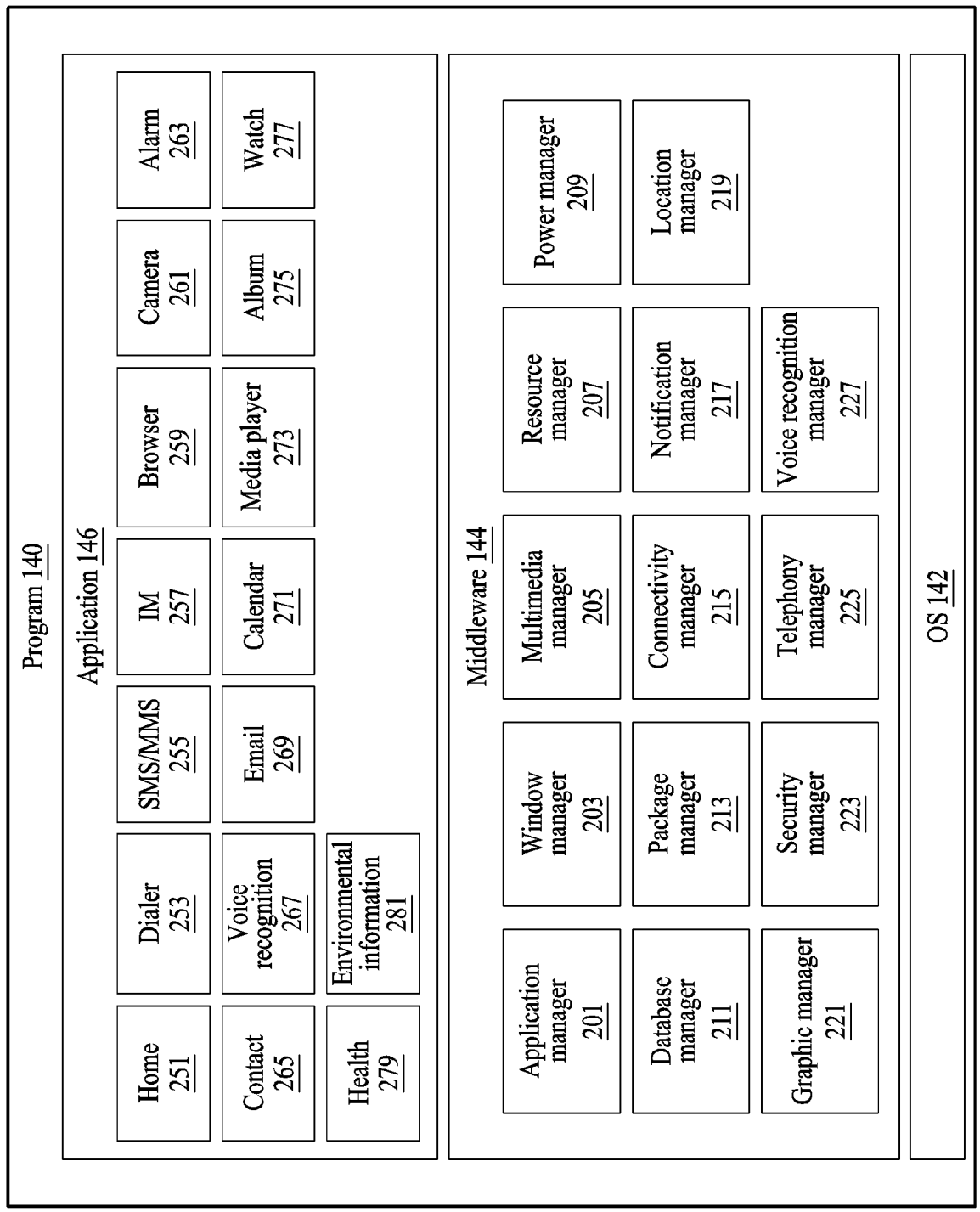
FIG. 2 is a block diagram illustrating a program according to an embodiment of the disclosure.

FIG. 2 is a block diagram illustrating a program according to an embodiment of the disclosure.

Referring to FIG. 2, in block diagram 200, the program 140 may include an OS 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the external electronic device 102 or 104, or the server 108) during use by a user.

The OS 142 may control management (e.g., allocation or deallocation) of one or more system resources (e.g., a process, a memory, or a power source) of the electronic device 101. The OS 142 may additionally or alternatively include other one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the SIM 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201 may, for example, manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and may determine or provide related information to be used for the operation of the electronic device 101 based on at least in part on corresponding information of the capacity, temperature, or power of the battery 189. According to an example embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, a message, or an alert). The location manager 219, for example, may manage location information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit user's voice data to the server 108, and may receive, from the server 108, a command corresponding to a function to be executed on the electronic device 101 based on at least in part on the voice data, or text data converted based on at least in part on the voice data. According to an example embodiment, the middleware 144 may dynamically delete some existing components or add new components. According to an example embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an example embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of an external electronic device that communicates with the electronic device 101 or a portion of components thereof (e.g., a display module or a camera module of the external electronic device). The device management application may additionally or alternatively support installation, delete, or update of an application running on the external electronic device.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101 of FIG. 1). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 3:
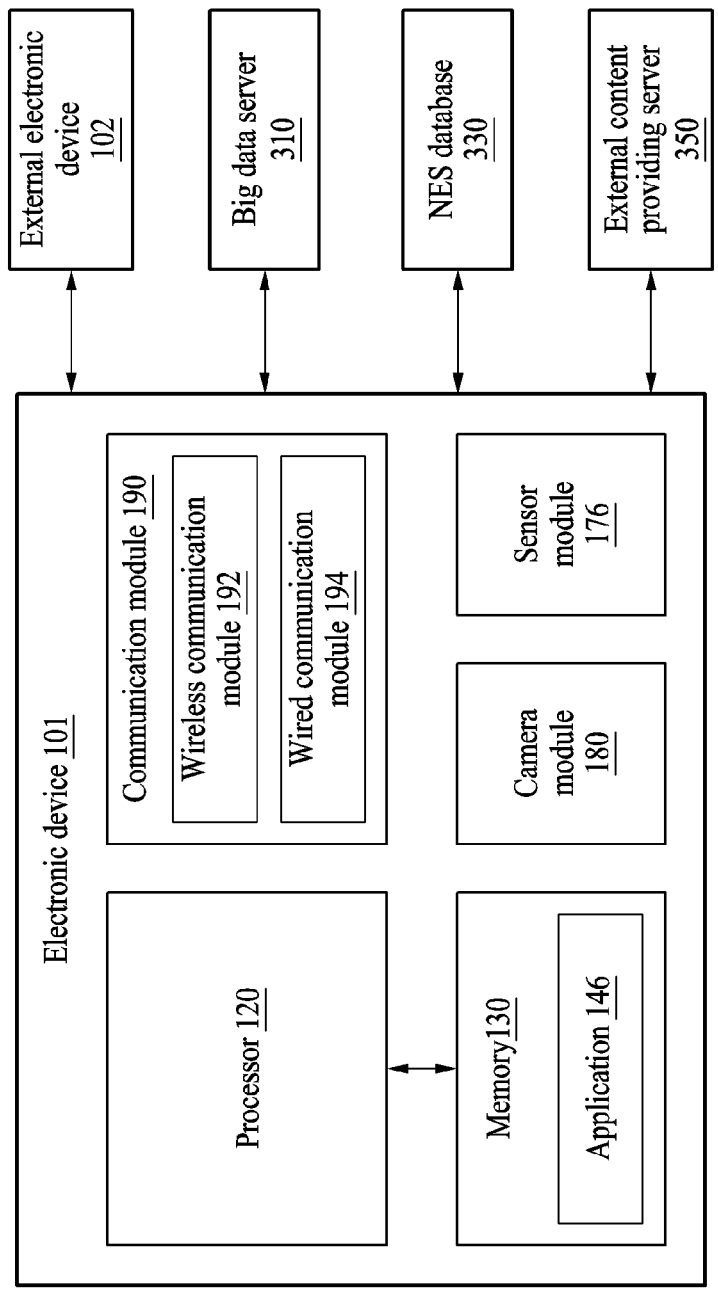
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 101 may include memory 130 storing computer-executable instructions and the processor 120 for executing the instructions by accessing the memory 130. As described with respect to the electronic device 101 in FIG. 1, the electronic device 101 may include the communication module 190 including the wireless communication module 192 and/or the wired communication module 194, the sensor module 176, and the camera module 180.

According to an example embodiment, as described with reference to FIG. 2, a program (e.g., the program 140 of FIG. 1) may be stored as software in the memory 130 of the electronic device 101, and for example, an OS (e.g., the OS 142 of FIG. 1), middleware (e.g., the middleware 144 of FIG. 1) or the application 146 may be included in the memory 130. The instructions stored in the memory 130 may be implemented as one function module in the OS (e.g., the OS 142 of FIG. 1), implemented in the form of middleware (e.g., the middleware 144 of FIG. 1), or implemented in the form of a separate application.

According to an example embodiment, the instructions stored in the memory 130 may be configured to identify content information on a first type of content that is output from the electronic device 101, when a content switching event is detected in the electronic device 101.

According to an example embodiment, the content switching event may be detected through the sensor module 176. The sensor module 176 may include at least one of a gesture sensor, a gyro sensor, a barometric pressure sensor, a magnetic sensor, an acceleration sensor, a grip sensor, a biometric sensor, and a proximity sensor, and the processor 120 may determine an angle at which the user grips the electronic device 101, whether the user is moving carrying the electronic device 101, or whether the screen is turned off, based on data collected by the sensor module 176.

According to an example embodiment, the content switching event may be detected through the camera module 180. For example, eye tracking technology may be utilized. The processor 120 may determine whether the user is gazing at the screen of the electronic device 101 by tracking movements of pupils of the user through the camera module 180.

According to an example embodiment, the content switching event may be detected through the communication module 190. The electronic device 101 may connect to the external electronic device 102 through the communication module 190, and when the electronic device 101 is connected to the external electronic device 102, it may be determined that a content switching event is detected.

The operation of detecting a content switching event is not limited to the above-described operation, and there may be various example embodiments. For example, when a touch by the user is detected through a touch sensor and/or a pressure sensor of a display module (e.g., the display module 160 of FIG. 1) of the electronic device 101, it may be determined that the user is in an environment that allows the user to concentrate on text. In addition, the content switching event is not limited to being detected only by an element in the electronic device 101, such as the sensor module 176 or the communication module 190, and whether a content switching event is detected for a change in a use environment for the electronic device 101 of the user may be comprehensively determined by communication with an external big data server 310. The use environment for the electronic device 101 and the operation of detecting a content switching event that the use environment changes according to various example embodiments will be described in detail with reference to FIG. 4.

According to an example embodiment, the instructions stored in the memory 130 may be configured to identify content information on a first type of content that is output from the electronic device 101. According to an example embodiment, a user may be executing the application 146 stored in the memory 130 of the electronic device 101, and the instructions may be configured to control to receive the content information from the application 146 and determine whether the content provided to the user through a display (e.g., the display module 160 of FIG. 1) is text content, video content, or image content. According to an example embodiment, the instructions may be configured to control to parse the HyperText Markup Language (HTML) code of a web page that is provided to the user to allow the user to determine a content type, a provider, an author, a subject, a publication date, a title, or a summary.

According to an example embodiment, a named entity service (NES) database 330 may be utilized in the operation of identifying the content information. The NES database 330 may store information on a named entity, and a type to which a word indicating a name belongs may be mapped to the information. The NES database 330 may be updated, and may be in the electronic device 101 or present in the form of a server outside the electronic device 101. The operation of identifying the content information according to various example embodiments will be described in detail with reference to FIGS. 5A and 5B.

According to an example embodiment, the instructions stored in the memory 130 may be configured to retrieve a second type of content related to the first type of content based on the content information on the first type of content that is output from the electronic device 101, and output the retrieved second type of content.

According to an example embodiment, the instructions may control to obtain the second type of content from the content information on the first type of content. For example, the first type of content may be text content, and the second type of content may be audio content or video content including audio, and the instructions may be configured to control to retrieve an audio file or a video file including audio from the HTML, code of the first type of content.

According to another example embodiment, the instructions may be configured to control to retrieve the second type of content from an external content providing server (a $3^{rd}$ party content provider) 350. For example, the second type of content may be obtained by retrieving "title" in the content information on the first type of content. According to an example embodiment, priorities of various media in a database to be retrieved from the external content providing server 350 may be changed by user configurations. The operation of retrieving the second type of content will be described in detail with reference to FIGS. 6A and 6B.

According to an example embodiment, the instructions may be configured to control to retrieve the second type of content from the external content providing server 350 when the second type of content is not retrieved from the content information on the first type of content. According to an example embodiment, the instructions may be configured to control to request a feedback from the user on whether to further search the external content providing server 350, when a content switching event is detected during the provision of the first type of content and the second type of content is not retrieved from the content information on the first type of content. When the electronic device 101 receives an auditory feedback such as "Yes" or a tactile feedback such as a screen touch from the user, the second type of content may be retrieved from the external content providing server 350.

According to an example embodiment, the instructions may be configured to control to output the retrieved second type of content. According to an example embodiment, when a content switching event is detected through the sensor module 176 of the electronic device 101, the second type of content may be output through the electronic device 101. According to an example embodiment, when a content switching event is detected as the connection of the electronic device 101 to the external electronic device 102 is detected through the communication module 190, the second type of content may be output through the external electronic device 102.

According to an example embodiment, the instructions may be configured to control to obtain output location information of the first type of content at a point in time at which the content switching event is detected, determine a corresponding target location in the retrieved second type of content, and output the second type of content from the target location. According to an example embodiment, when the user views a found recipe with the electronic device 101 and then puts down the electronic device 101 to keep cooking, relevant audio content or video content including audio may be played back from the last page that the user was viewing, providing the user with a seamless user experience. The operation of obtaining the output location information of the first type of content in relation to the seamless user experience will be described in detail with reference to FIGS. 7A and 7B.

According to an example embodiment, the first type of content may be text content, and the second type of content may be one of audio content and video content including audio.

According to an example embodiment, the first type of content may be one of audio content and video content including audio, and the second type of content may be text content.

Figure 4:
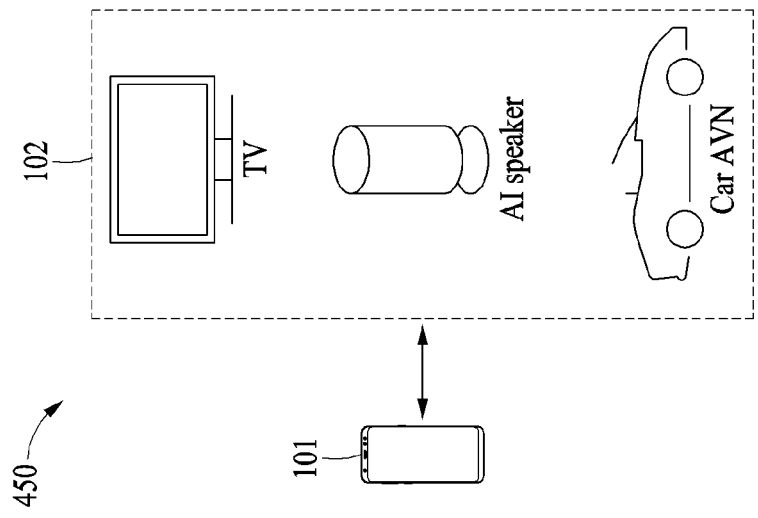
FIG. 4 is a diagram to describe a content switching event according to an embodiment of the disclosure.
Figure 4:
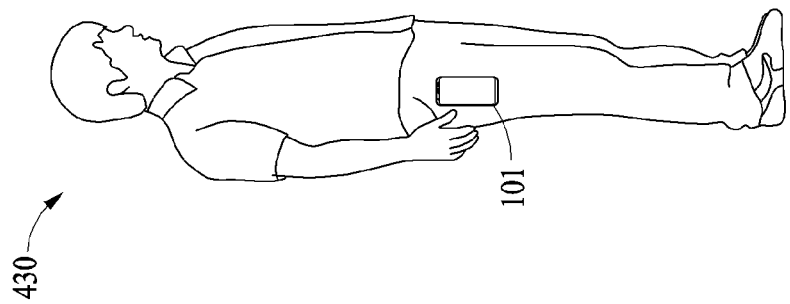
Figure 4:
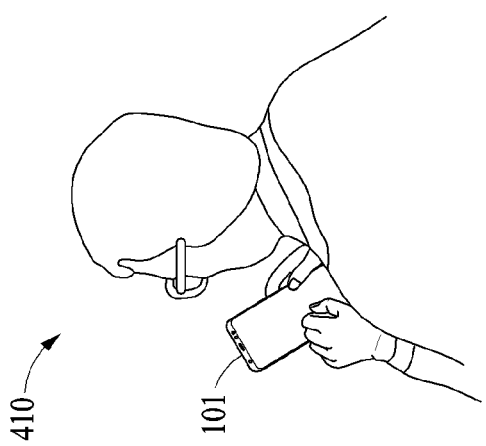

FIG. 4 is a diagram to describe a content switching event according to an embodiment of the disclosure.

Referring to FIG. 4, a content switching event that a use environment of an electronic device 101 is changed according to various example embodiments will be described. When a user uses the electronic device 101, there may be an environment in which the user concentrates on text content and an environment in which the user does not concentrate on text, and the instructions stored in the memory of the electronic device 101 may be configured to detect a content switching event of switching between the two environments, as described with reference to FIG. 3.

Reference numeral 410 shows an environment in which the user concentrates on text, and reference numeral 430 shows an environment in which the user is unable to concentrate on text. According to various example embodiments, the instructions may be configured to control to determine whether the user gazes at the screen of the electronic device 101, a rate of movement of the user, or whether the screen of the electronic device 101 is turned on through a sensor module (e.g., the sensor module 176 of FIG. 3), and detect a content switching event from the environment 410 in which the user concentrates on text to the environment 430 in which the user is unable to concentrate on text or reversely a content switching event from the environment 430 in which the user is unable to concentrate on text to the environment 410 in which the user concentrates on text.

According to various example embodiments, the instructions may be configured to control to determine that a content switching event from the environment 410 in which the user concentrates on text to the environment 430 in which the user is unable to concentrate on text, when the user stops gazing at the screen, when the screen is turned off, or when the electronic device 101 starts moving.

According to an example embodiment, the instructions may be configured to control to recommend the user to be provided with the content through a more appropriate electronic device, when a content switching event from the environment 410 in which the user concentrates on text to the environment 430 in which the user is unable to concentrate on text, and an electronic device (e.g., an artificial intelligence (AI) speaker, a smart television (TV)) that is more appropriate for providing audio content or video content including audio is near the electronic device 101. A nearby device detecting module (not shown) may be utilized to detect the nearby electronic device. The nearby device detecting module may be a software module that is executed by the processor 120, or at least a portion thereof may be implemented as a hardware-based module.

According to various example embodiments, the instructions may be configured to control to determine that a content switching event from the environment 430 in which the user is unable to concentrate on text to the environment 410 in which the user concentrates on text, when the user starts gazing at the screen, when the screen is turned on, or when the electronic device 101 stops moving.

As described above with reference to FIG. 3, the content switching events between the environment 410 in which the user concentrates on text and the environment 430 in which the user is unable to concentrate on text may be detected by various modules (e.g., the sensor module 176 or the camera module 180 of FIG. 3) of the electronic device 101.

Reference numeral 450 shows a case in which the electronic device 101 is connected to the external electronic device 102. According to an example embodiment, when the electronic device 101 is connected to or disconnected from the external electronic device 102, it may also be a content switching event. The external electronic device 102 may include a smart TV, an AI speaker, or a car audio video navigation (AVN).

According to an example embodiment, the instructions may be configured to control to determine that a content switching event from the environment 410 in which the user concentrates on text to the environment 430 in which the user is unable to concentrate on text is detected, when a connection to the external electronic device 102 is detected through the communication module (e.g., the communication module 190 of FIG. 3).

According to an example embodiment, the instructions may be configured to control to determine that a content switching event from the environment 430 in which the user is unable to concentrate on text to the environment 410 in which the user concentrates on text is detected, when a disconnection of the electronic device 101 from the external electronic device 102 is detected through the communication module (e.g., the communication module 190 of FIG. 3).

According to an example embodiment, the instructions may be configured to control to set configurations to output the second type of content through the external electronic device 102 when the electronic device 101 is connected to the external electronic device 102, and set configurations to output the first type of content through the electronic device 101 again when the electronic device 101 is disconnected from the external electronic device 102.

An example embodiment in which a content switching event is detected through a sensor module (e.g., the sensor module 176 of FIG. 3) of the electronic device 101 and an example embodiment in which a content switching event is detected through a communication module (e.g., the communication module 190 of FIG. 3) of the electronic device 101 are not mutually exclusive, and the detection of a content switching event may be determined comprehensively in view of the detection results from the sensor module and the communication module. According to an example embodiment, the instructions may be configured to control to determine that a content switching event from the environment 410 in which the user concentrates on text to the environment 430 in which the user is unable to concentrate on text is detected, when the screen of the electronic device 101 is turned off, or when a connection between the electronic device 101 and a car AVN is detected.

Figure 5A:
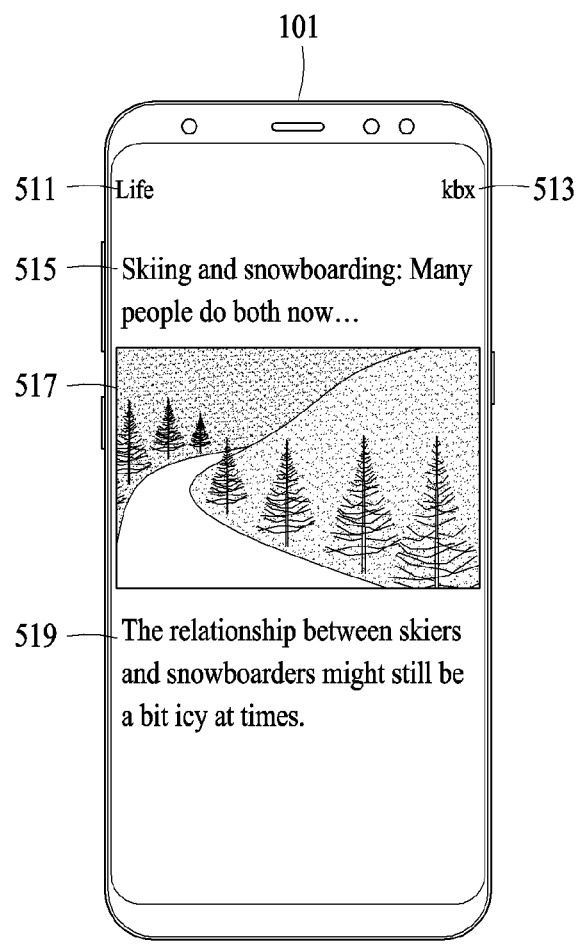

FIGS. 5A and 5B are diagrams to describe content information according to various embodiments of the disclosure.

Referring to FIG. 5A, a news article web page according to an example embodiment is provided through an electronic device 101. On the web page screen that is output may include any one or more of a content category 511, a content provider 513, a content title 515, an image 517, and detailed body 519.

According to an example embodiment, the instructions stored in the memory (e.g., the memory 130 of FIG. 1) may be configured to control to identify content information on a first type of content that is output from the electronic device 101. The content information may include text content, HTML code of the web page, and detailed information (e.g., a content type, a provider, an author, a host, etc.) obtained from the text content or the HTML code.

According to an example embodiment, the information on the content type, the provider, the author, and the host may be identified by utilizing an NES database (e.g., the NES database 330 of FIG. 3). The NES database 330 may store information on a named entity, and a type to which a word indicating a name belongs may be mapped to the information. For example, in FIG. 5A, it may be determined through the NES database 330 that of the texts on the screen output from the electronic device 101, a text "Life" denotes the content category 511, a text "kbx" denotes the content provider 513, a text "Skiing and snowboarding: Many people do both now . . . " denotes the content title 515, or a text "The relationship . . . at times," denotes the detailed body 519 of the content.

Referring to FIG. 5B, a portion of the HTML code for a web page screen of FIG. 5A is shown. Instructions stored in a memory (e.g., the memory 130 of FIG. 3) of an electronic device (e.g., the electronic device 101 of FIG. 3) may be configured to parse the HTML code to identify the content information on the first type of content that is output from the electronic device 101. According to an example embodiment, information 535 on the content title or information 539 on the detailed body may be identified from the HTML code. According to an example embodiment, even in identifying the content information from the HTML code, the NES database 330 may be utilized as described above.

Figure 6B:
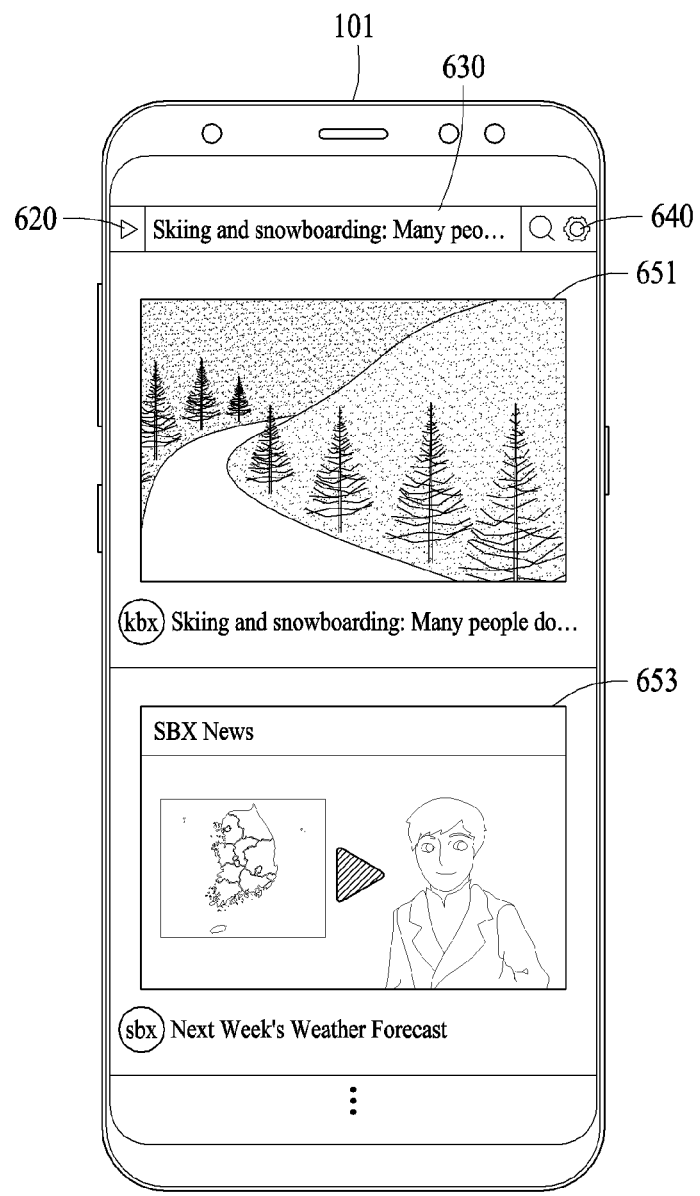

FIGS. 6A and 6B are diagrams to describe an operation of retrieving a second type of content from content information on a first type of content according to various embodiments of the disclosure.

Referring to FIG. 6A, a second type of content may be retrieved from content information of a first type of content. According to an example embodiment, a portion of the HTML code for the web page of FIG. 5A is shown in FIG. 6A, as in FIG. 5B. The HTML code may include information on the second type of content, for example, audio content or video content including audio. According to an example embodiment, like the image 517 of FIG. 5A, an image corresponding to the second type of content may be included in the first type of content that is output from an electronic device (e.g., the electronic device 101 of FIG. 3). Alternatively, like box 610 of FIG. 6A, the second type of content may be retrieved from the content information of the first type of content.

Referring to FIG. 6B, a second type of content may be retrieved from an external content providing server (e.g., the external content providing server 350 of FIG. 3) based on the content information of the first type of content. According to an example embodiment, as described with reference to FIGS. 5A and 5B, the content information on the first type of content may be identified, and then the second type of content may be retrieved from the external content providing server 350 based on the "content title," the "date of preparation," or the "provider." According to an example embodiment, in FIG. 6B, of multiple items of content 651 and 653 found by searching with a content title 630 of a first type of content in a video providing application 620, the content 651 on the top may be output as a second type of content.

According to an example embodiment, when search settings 640 further reflect content information on the first type of content, such as a date of preparation of the content or a provider, a second type of content more highly relevant to the first type of content may be retrieved.

Although FIG. 6B shows a case of searching in the video providing application 620, example embodiments are not limited thereto. The second type of content may be retrieved through various external media such as a podcast or a radio. As described with reference to FIG. 3, priorities of the various media for retrieval may be changed by user configurations.

Figure 7A:
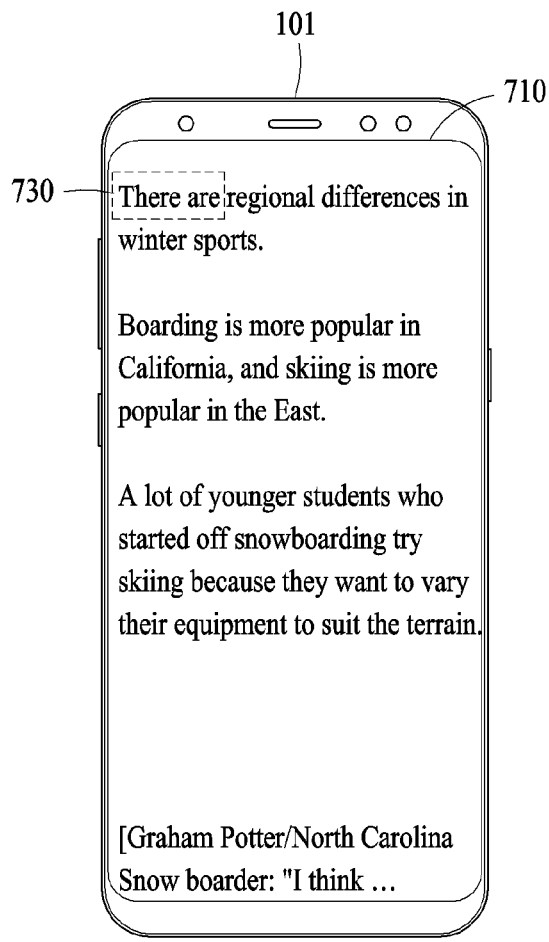
FIGS. 7A and 7B are diagrams to describe an operation of obtaining output location information of a first type of content according to various embodiments of the disclosure.
Figure 7B:
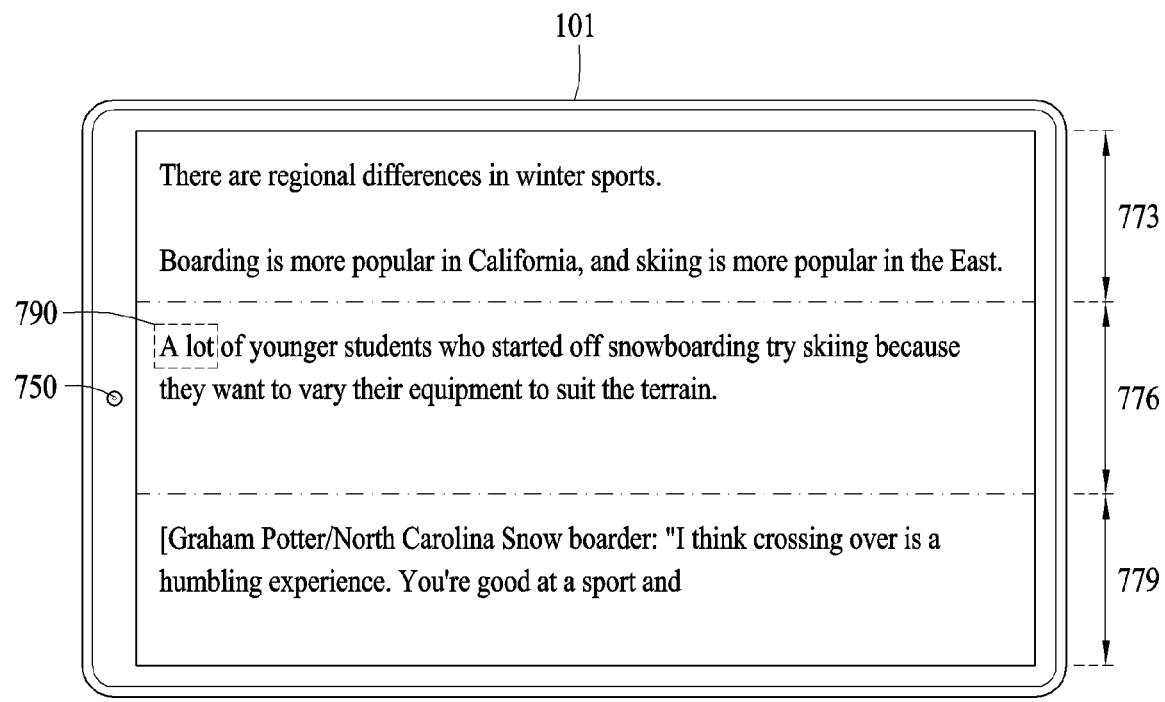

FIGS. 7A and 7B are diagrams to describe an operation of obtaining output location information of a first type of content according to various embodiments of the disclosure.

Referring to FIG. 7A, an operation of obtaining output location information of a first type of content when the first type of content is text, and a second type of content is audio content or video content including audio is shown. According to an example embodiment, instructions stored in a memory (e.g., the memory 130 of FIG. 3) may be configured to obtain output location information of the first type of content that is output from the electronic device 101 at a point in time at which a content switching event is detected. According to an example embodiment, the section of the first type of content that the user was viewing may be determined by determining a reference text 730 of an output screen 710 of the electronic device 101 at the point in time at which the content switching event is detected. Although FIG. 7A shows the first two words as the reference text 730, example embodiments are not limited thereto. According to an example embodiment, the entire text in a first line of the output screen 710 may be determined to be a reference text, and the reference text may be determined based on various standards according to settings.

Referring to FIG. 7B, an operation of obtaining output location information of the first type of content through eye tracking technology according to an example embodiment is shown. According to an example embodiment, when the electronic device 101 includes a large screen, like as a tablet, the output location information may be obtained by tracking movements of pupils of a user through a front camera 750. According to an example embodiment, the screen of the electronic device 101 may be divided into an upper portion 773, a middle portion 776, and a lower portion 779, and when the user is gazing at the middle portion 776 at the point in time at which a content switching event occurs, the section that the user was viewing may be determined by determining a reference text 790 in the middle portion 776. According to various example embodiments, the method or standard of dividing the screen of the electronic device 101 may depend on the accuracy of eye tracking technology or the size of the screen of the electronic device 101. As described with reference to FIG. 7A, the reference text 790 may be set as the first two words in the portion of the screen in which the gaze is detected, or may be determined by various standards according to user configurations.

According to an example embodiment, in FIGS. 7A and 7B, instructions stored in a memory (e.g., the memory 130 of FIG. 3) may be configured to obtain the output location information of the first type of content at the point in time at which the content switching event is detected, and determine a target location corresponding to the output location information of the first type of content in the second type of content. As described with reference to FIGS. 5A to 6B, when the second type of content related to the first type of content is retrieved, the second type of content may be provided from the target location corresponding to the output location of the first type of content in the second type of content.

According to an example embodiment, when the first type of content is text content, and the second type of content is audio content or video content including audio, the second type of content may be converted into text through speech-to-text (STT), and a reference text determined as described with reference to FIGS. 7A and 7B may be mapped to determine the target location. According to an example embodiment, reference text "There are" 730 in the case of FIG. 7A or reference text "A lot" 790 in the case of FIG. 7B may be mapped to the text converted from the audio content or video content including audio through STT, whereby the target location may be determined. The instructions may be configured to control to provide the second type of content from the target location, thereby providing the user with a seamless user experience.

Figure 8:
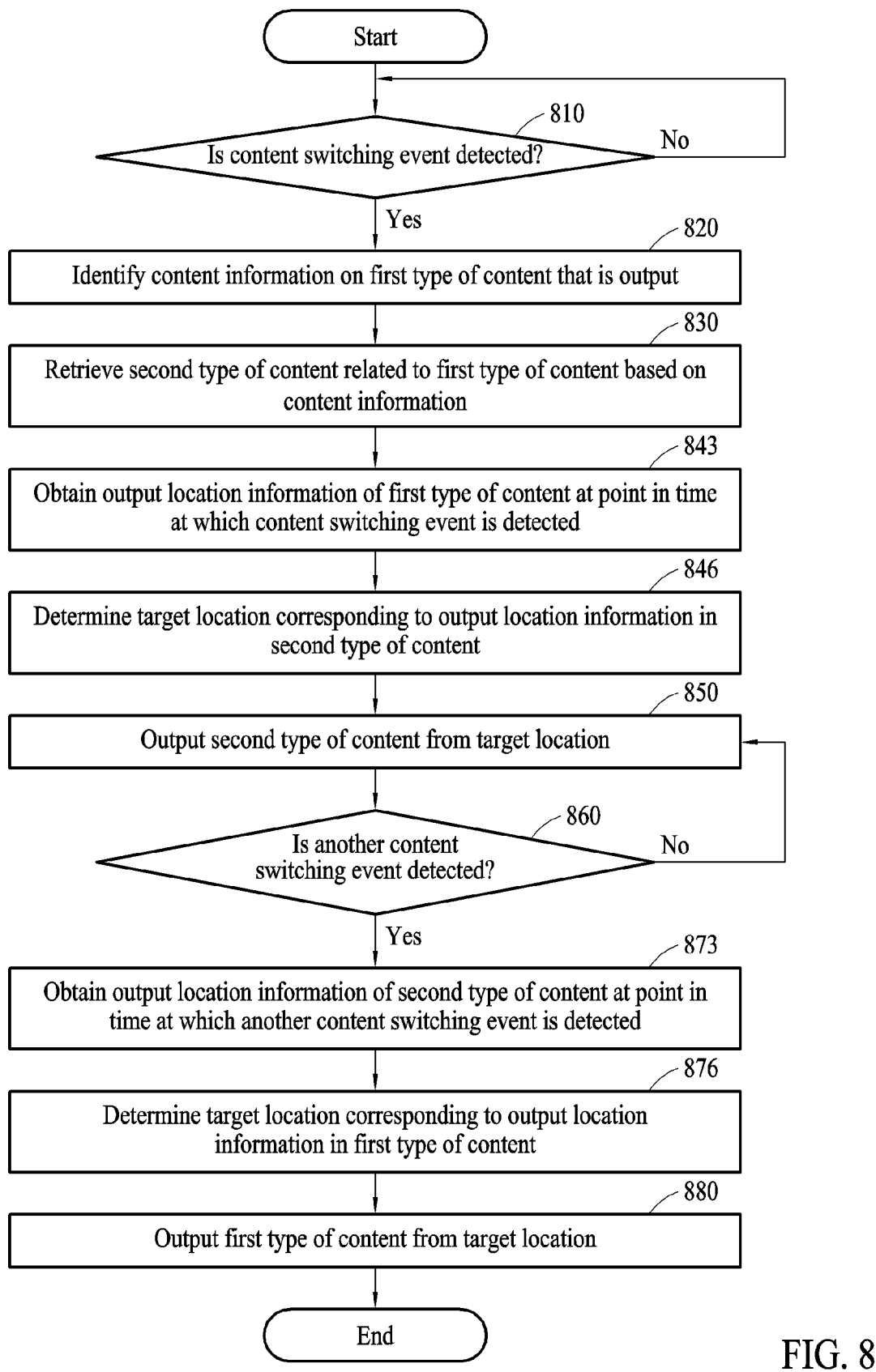
FIG. 8 is a flowchart to describe an operating method of an electronic device according to an embodiment of the disclosure.

FIG. 8 is a flowchart to describe an operating method of an electronic device according to an embodiment of the disclosure.

A series of operations described below may be performed by the processor 120 of the electronic device 101 of FIG. 1 or 3, or may be performed in a different order, or some operations may be omitted or added.

Referring to FIG. 8, an operating method of an electronic device according to various example embodiments is described. According to an example embodiment, when a content switching event is detected, in operation 810, content information on a first type of content that is output through a display (e.g., the display module 160 of FIG. 1) may be identified, in operation 820. As described with reference to FIG. 4, the content switching event may be an event of switching between an environment in which a user concentrates on text (e.g., the environment 410 in which the user concentrates on text) and an environment in which the user is unable to concentrate on text (e.g., the environment 430 in which the user is unable to concentrate on text), and may be detected through a sensor module (e.g., the sensor module 176 of FIG. 3) and/or a communication module (e.g., the communication module 190 of FIG. 3) of an electronic device (e.g., the electronic device 101 of FIG. 3). Operation 810 will be described in detail with reference to FIG. 9.

According to an example embodiment, in operation 820, the content information on the first type of content that is output through the display may be identified as described with reference to FIGS. 5A and 5B. According to an example embodiment, instructions stored in a memory (e.g., the memory 130 of FIG. 3) may be configured to parse a text and/or HTML code of the first type of content that is output through the display, and identify the content information regarding detailed information (e.g., a content type, a title, a provider, or a date of preparation) based on an NES database (e.g., the NES database 330 of FIG. 3).

According to an example embodiment, in operation 830, a second type of content related to the first type of content may be retrieved based on the content information. According to an example embodiment, the instructions stored in the memory 130 may be configured to retrieve the second type of content from the content information as described with reference to FIG. 6A, or retrieve the second type of content from an external content providing server (e.g., the external content providing server 350 of FIG. 3) based on the content information as described with reference to FIG. 6B, by using the content information of the first type of content identified in operation 820.

According to an example embodiment, in operation 843, output location information of the first type of content may be obtained at a point in time at which the content switching event is detected. According to an example embodiment, as described with reference to FIG. 7A, output location information of the first type of content in the electronic device (e.g., the electronic device 101 of FIG. 7A) at the point in time at which the content switching event is detected may be determined based on a reference text (e.g., the reference text 730 of FIG. 7A) on the output screen. According to an example embodiment, as described with reference to FIG. 7B, a reference text (e.g., the reference text 790 of FIG. 7B) may be determined on the divided screen of an electronic device (e.g., the electronic device 101 of FIG. 7B) through eye tracking technology at the point in time at which the content switching event is detected, and output location information of the first type of content may be determined based on the corresponding text. According to an example embodiment, operation 843 may not be performed according to the order shown in FIG. 8, and may be performed substantially in parallel at the point in time at which the content switching event is detected, after operation 810 of detecting the content switching event is performed.

According to an example embodiment, in operation 846, a target location corresponding to the output location information in the second type of content may be determined. According to an example embodiment, when the first type of content is text content, and the second type of content is audio content or video content including audio, the target location may be determined by mapping the text determined in operation 843 within a text converted from the second type of content through STT.

According to an example embodiment, in operation 850, the second type of content may be output from the target location. According to an example embodiment, when the content switching event detected in operation 810 is a connection to an external electronic device (e.g., the external electronic device 102 of FIG. 3), the second type of content may be output through the external electronic device. According to an example embodiment, when the content switching event detected in operation 810 is a disconnection from the external electronic device (e.g., the external electronic device 102 of FIG. 3), the second type of content may be output through the electronic device (e.g., the electronic device 101 of FIG. 3).

According to an example embodiment, when the first type of content is text content, the second type of content is audio content or video content including audio, and the second type of content is not retrieved in operation 830, the second type of content may not be output from the target location in operation 850, but audio converted from the first type of content through text-to-speech (TTS) may be output instead. According to an example embodiment, audio converted from a reference text (e.g., the reference text 730 of FIG. 7A or the reference text 790 of FIG. 7B) corresponding to the output location information of the first type of content obtained in operation 843 through TTS may be output.

According to an example embodiment, while the second type of content is output, another content switching event may be detected, in operation 860. As described with reference to FIG. 4, a content switching event refers to an event of switching between use environments of the electronic device (e.g., the electronic device 101 of FIG. 3). When a content switching event is detected in operation 810, and then another content switching event is detected in operation 860, it may be a return to the use environment before operation 810.

According to an example embodiment, the use environment may be switched from an environment in which the user concentrates on text (e.g., the environment 410 in which the user concentrates on text) to an environment in which the user is unable to concentrate on text (e.g., the environment 430 in which the user is unable to concentrate on text) in operation 810, and then switched back to the environment 410 in which the user concentrates on text in operation 860. According to another example embodiment, the use environment may be switched from an environment in which the user is unable to concentrate on text (e.g., the environment 430 in which the user is unable to concentrate on text) to an environment in which the user concentrates on text (e.g., the environment 410 in which the user concentrates on text) in operation 810, and then switched back to the environment 430 in which the user is unable to concentrate on text in operation 860.

According to an example embodiment, in operation 873, output location information of the second type of content may be obtained at a point in time at which the another content switching event is detected. For example, when the first type of content is text content, and the second type of content is audio content or video content including audio, information on a text converted through STT from the second type of content that is output at the point in time at which the another content switching event is detected may be obtained in operation 873.

According to an example embodiment, in operation 876, a target location corresponding to the output location information in the first type of content may be determined. For example, when the first type of content is text content, and the second type of content is audio content or video content including audio, the target location of the first type of content corresponding to the output location of the second type of content may be determined by mapping the text obtained in operation 873 within the first type of content, in operation 876.

According to an example embodiment, in operation 880, the first type of content may be output from the target location. This may allow the user to have a seamless user experience even when the type of content changes.

According to an example embodiment, when the user gets on a car while reading text content (e.g., a news article) with a smart phone, and the smart phone is connected to a car AVN system (e.g., operation 810), content information of the text content may be identified (e.g., operation 820), and audio content or video content including audio (e.g., an audio file or video file of the news) may be retrieved based on the content information (e.g., operation 830). The section of the text content that the user was reading at a point in time at which the smart phone is connected to the car may be determined (e.g., operation 843), a target location corresponding to the section that the user was reading may be determined in the audio content or video content including audio (e.g., operation 846), and the audio content or video content including audio may be output from the target location through a speaker or a display of the car AVN system (e.g., operation 850). When the user gets off the car, and the smart phone is disconnected from the car AVN system (e.g., operation 860), output location information of the audio content or video content at the corresponding point in time may be obtained (e.g., operation 873). A target location corresponding to the output location information at the point in time of the disconnection may be determined in the text content (e.g., the news article) that was provided before getting on the car (e.g., operation 876), and the text content may be output from the target location through the display of the smart phone (e.g., operation 880).

According to an example embodiment, operations 873, 876, and 880 describe an example of content toggling that provides the previously provided first type of content again. However, example embodiments are not limited thereto, and a new first type of content may be retrieved. For example, after operation 860, a new first type of content may be retrieved through an operation of identifying again content information on the second type of content that is output through the display and/or a sound output module (e.g., the sound output module 155 of FIG. 1), like operation 820, or an operation of retrieving the first type of content related to the second type of content based on the content information, like operation 830. According to an example embodiment, it may be configured such that the user may select whether to provide the previously output first type of content or provide the retrieved new first type of content.

Figure 9:
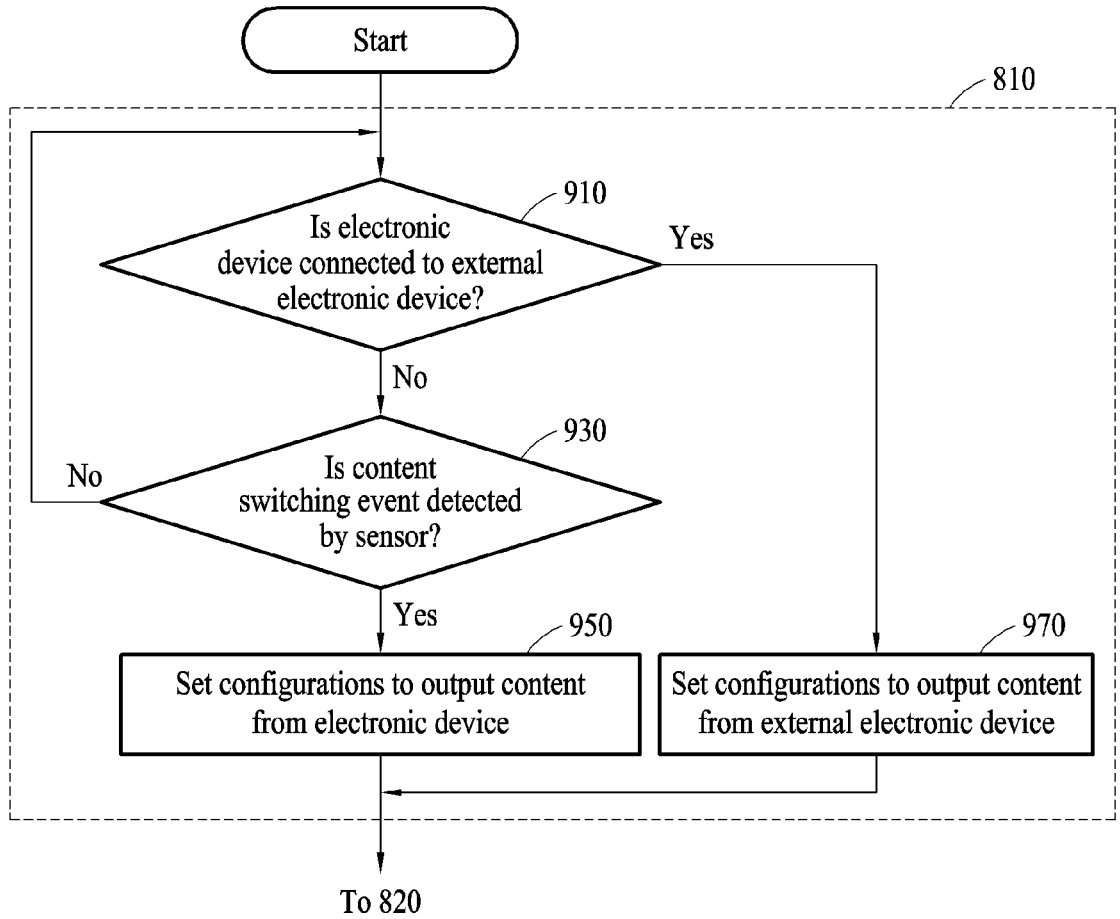
FIG. 9 is a flowchart to describe an operation of detecting a content switching event according to an embodiment of the disclosure.

FIG. 9 is a flowchart to describe an operation of detecting a content switching event according to an embodiment of the disclosure.

Referring to FIG. 9, operation 810 of detecting a content switching event of FIG. 8 is shown more specifically. According to an example embodiment, in operation 910, whether an electronic device (e.g., the electronic device 101 of FIG. 3) is connected to an external electronic device (e.g., the external electronic device 102 of FIG. 3) may be detected through a communication module (e.g., the communication module 190 of FIG. 3). When the electronic device is connected to the external electronic device ("Yes" in operation 910), configurations may be set to output content from the external electronic device through the communication module, in operation 970.

According to an example embodiment, in operation 930, a content switching event may be detected by a sensor module (e.g., the sensor module 176 of FIG. 3). When the content switching event is detected by the sensor module ("Yes" in operation 930), configurations may be set to output the content from the electronic device (e.g., the electronic device 101 of FIG. 3), in operation 950.

Although it has been described that the electronic device is connected to the external electronic device in operation 910 or that the content switching event is detected through a sensor in operations 930, example embodiments are not limited thereto, and various example embodiments may be possible. According to an example embodiment, as described above with reference to FIG. 3, when a touch by the user is detected through a touch sensor and/or a pressure sensor of a display module (e.g., the display module 160 of FIG. 1) of the electronic device (e.g., the electronic device 101 of FIG. 1), it may be determined that the user is in an environment in which the user is able to concentrate on text content. In addition, the content switching event is not limited to being detected only by an element in the electronic device (e.g., the electronic device 101 of FIG. 3), such as a sensor module (e.g., the sensor module 176 of FIG. 3) or a communication module (e.g., the communication module 190 of FIG. 3), and whether a content switching event is detected for a change in a use environment for the electronic device of the user may be comprehensively determined by communication with an external big data server (e.g., the big data server 310 of FIG. 3).

Figure 10:
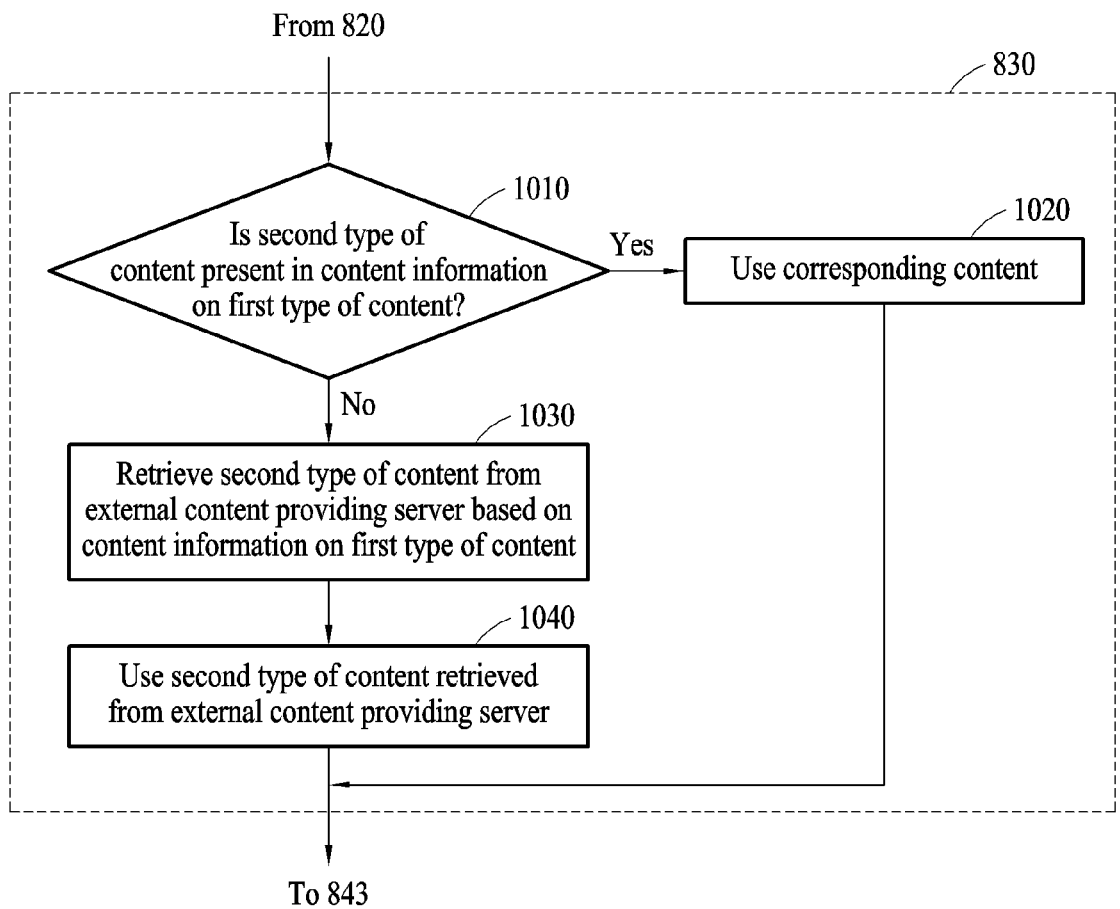
FIG. 10 is a flowchart to describe an operation of retrieving a second type of content according to an embodiment of the disclosure.

FIG. 10 is a flowchart to describe an operation of retrieving a second type of content according to an embodiment of the disclosure.

Referring to FIG. 10, when the second type of content is included in the content information on the first type of content, in operation 1010 ("Yes" in operation 1010), it may be configured to use the corresponding content (e.g., the second type of content present in the content information on the first type of content), in operation 1020. For example, as described with reference to FIG. 6A, the second type of content may be retrieved from the HTML, code of the first type of content.

According to an example embodiment, when the second type of content is absent from the content information of the first type of content in operation 1010 ("No" in operation 1010), the second type of content may be retrieved from an external content providing server (e.g., the external content providing server 350 of FIG. 3) based on the content information on the first type of content (e.g., a content title, a date of preparation, or a provider), in operation 1030, and the second type of content retrieved from the external content providing server is used, in operation 1040. According to an example embodiment, as described with reference to FIG. 6B, the second type of content may be retrieved through various external media such as a video providing application, a podcast, or a radio, and priorities of the various media for retrieval may be changed by the user.

Figure 11:
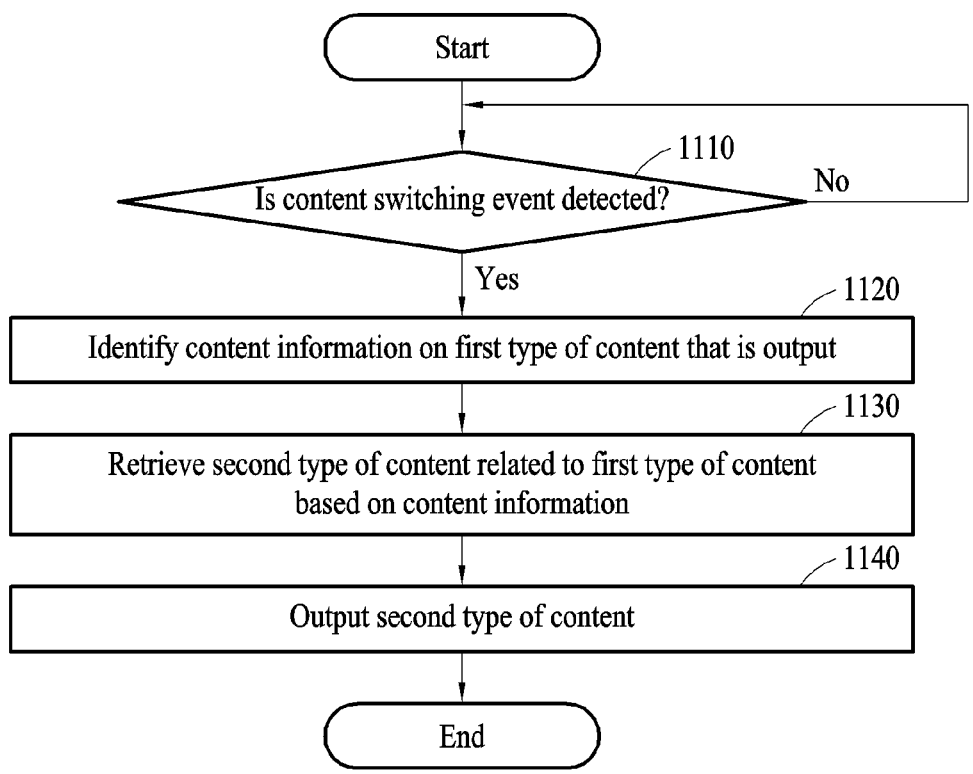
FIG. 11 is a flowchart to describe an operating method of an electronic device according to an embodiment of the disclosure.

FIG. 11 is a flowchart to describe an operating method of an electronic device according to an embodiment of the disclosure.

A series of operations described below may be performed by the processor 120 of the electronic device 101 of FIG. 1 or 3, or may be performed in a different order, or some operations may be omitted or added.

Operations 1120, 1130, and 1140 of FIG. 11 may be those excluding a portion of the operations of FIG. 8. Thus, for simple and precise description, a duplicated description may be omitted.

Referring to FIG. 11, an operating method of an electronic device according to various example embodiments is described. According to an example embodiment, when a content switching event is detected, in operation 1110, content information on a first type of content that is output through a display (e.g., the display module 160 of FIG. 1) may be identified, in operation 1120.

As described with reference to FIG. 4, the content switching event may be an event of switching between an environment in which a user concentrates on text (e.g., the environment 410 in which the user concentrates on text) and an environment in which the user is unable to concentrate on text (e.g., the environment 430 in which the user is unable to concentrate on text), and may be detected through a sensor module (e.g., the sensor module 176 of FIG. 3) and/or a communication module (e.g., the communication module 190 of FIG. 3) of an electronic device (e.g., the electronic device 101 of FIG. 3).

According to an example embodiment, in operation 1120, the content information on the first type of content that is output through the display may be identified as described with reference to FIGS. 5A and 5B. According to an example embodiment, instructions stored in a memory (e.g., the memory 130 of FIG. 3) may be configured to parse a text and/or HTML code of the first type of content that is output through the display, and identify the content information regarding detailed information (e.g., a content type, a title, a provider, or a date of preparation) based on an NES database (e.g., the NES database 330 of FIG. 3).

According to an example embodiment, in operation 1130, a second type of content related to the first type of content may be retrieved based on the content information. According to an example embodiment, the instructions stored in the memory 130 may be configured to retrieve the second type of content from the content information as described with reference to FIG. 6A, or retrieve the second type of content from an external content providing server (e.g., the external content providing server 350 of FIG. 3) based on the content information as described with reference to FIG. 6B, by using the content information of the first type of content identified in operation 1120.

According to an example embodiment, in operation 1140, the second type of content retrieved in operation 1130 may be output. According to an example embodiment, when the content switching event detected in operation 1110 is a connection to an external electronic device (e.g., the external electronic device 102 of FIG. 3), the second type of content may be output through the external electronic device. According to an example embodiment, when the content switching event detected in operation 1110 is a disconnection from the external electronic device (e.g., the external electronic device 102 of FIG. 3), the second type of content may be output through the electronic device (e.g., the electronic device 101 of FIG. 3).

According to an example embodiment, the electronic device (e.g., the electronic device 101 of FIG. 3) may include a memory (e.g., the memory 130 of FIG. 3) storing computer-executable instructions and a processor (e.g., the processor 120 of FIG. 3) for executing the instructions by accessing the memory.

According to an example embodiment, the instructions may be configured to control to, when a content switching event is detected in the electronic device, identify content information on the first type of content that is output from the electronic device, retrieve the second type of content related to the first type of content based on the content information, and output the retrieved second type of content.

According to an example embodiment, the electronic device (e.g., the electronic device 101 of FIG. 3) may further include one or more sensor modules (e.g., the sensor module 176 of FIG. 3), and the content switching event may be detected through the sensor module.

According to an example embodiment, the electronic device (e.g., the electronic device 101 of FIG. 3) may further include a wired/wireless communication module (e.g., the communication module 190 of FIG. 3) for connecting the electronic device to one or more external electronic devices (e.g., the external electronic device 102 of FIG. 3), and the content switching event may be detected through the wired/wireless communication module, and it may be configured to output the second type of content from the external electronic device.

According to an example embodiment, the instructions may be configured to control to retrieve the second type of content from at least one of the content information and an external content providing server (e.g., the external content providing server 350 of FIG. 3).

According to an example embodiment, the instructions may be further configured to control to obtain output location information of the first type of content at a point in time at which the content switching event is detected, determine a target location corresponding to the output location information in the second type of content, and output the second type of content from the target location.

According to an example embodiment, the instructions may be configured to control to, when another content switching event is detected, output the first type of content again.

According to an example embodiment, the first type of content may be text content, and the second type of content may be one of audio content and video content including audio.

According to an example embodiment, the first type of content may be one of audio content and video content including audio, and the second type of content may be text content.

According to an example embodiment, the operating method of the electronic device (e.g., the electronic device 101 of FIG. 3) may include, when a content switching event is detected in the electronic device, identifying content information on the first type of content that is output from the electronic device, retrieving the second type of content related to the first type of content based on the content information, and outputting the second type of content.

According to an example embodiment, the content switching event may be detected through one or more sensor modules (e.g., the sensor module 176 of FIG. 3).

According to an example embodiment, the content switching event may be detected through the wired/wireless communication module (e.g., the communication module 190 of FIG. 3) for connecting the electronic device to one or more external electronic devices (e.g., the external electronic device 102 of FIG. 3), and the second type of content may be output from the external electronic device.

According to an example embodiment, the operating method of the electronic device may include retrieving the second type of content from at least one of the content information and the external content providing server (e.g., the external content providing server 350 of FIG. 3).

According to an example embodiment, the operating method of the electronic device may include obtaining output location information of the first type of content at a point in time at which the content switching event is detected, determining a target location corresponding to the output location information in the second type of content, and outputting the second type of content from the target location.

According to an example embodiment, the operating method of the electronic device may further include, when another content switching event is detected, outputting the first type of content again.

According to an example embodiment, the first type of content may be text content, and the second type of content may be one of audio content and video content including audio.

According to an example embodiment, the first type of content may be one of audio content and video content including audio, and the second type of content may be text content.

According to an example embodiment, a program for controlling an operation of the electronic device (e.g., the electronic device 101 of FIG. 3) may be recorded in a recording medium, wherein the program may be configured to cause the electronic device to perform, when a content switching event is detected in the electronic device, identifying content information on the first type of content that is output from the electronic device, retrieving the second type of content related to the first type of content based on the content information, and outputting the second type of content.

According to an example embodiment, the program may further be configured to cause the electronic device to perform obtaining output location information of the first type of content at a point in time at which the content switching event is detected, determining a target location corresponding to the output location information in the second type of content, and outputting the second type of content from the target location.

According to an example embodiment, the first type of content may be text content, and the second type of content may be one of audio content and video content including audio.

According to an example embodiment, the first type of content may be one of audio content and video content including audio, and the second type of content may be text content.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
memory storing computer-executable instructions; and
a processor configured to execute the instructions by accessing the memory,
wherein the instructions, when executed by the processor, cause the processor to,
in response to the electronic device detecting a content switching event, identify content information on a first type of content that is output from the electronic device,
while the electronic device outputs the first type of content, determine whether the content information includes information about a second type of content related to the first type of content,
retrieve the second type of content related to the first type of content based on the content information in response to the content information including the information about the second type of content, and
output the second type of content.

2. The electronic device of claim 1, further comprising:
one or more sensors,
wherein the content switching event is detected through the one or more sensors.

3. The electronic device of claim 1, further comprising:
a communicator configured to connect the electronic device to one or more external electronic devices,
wherein the content switching event is detected through the communicator, and
wherein the second type of content is output from the one or more external electronic devices.

4. The electronic device of claim 1, wherein the instructions, when executed by the processor, further cause the processor to retrieve the second type of content from at least one of the content information or an external content providing server.

5. The electronic device of claim 1, wherein the instructions, when executed by the processor, further cause the processor to:
obtain output location information of the first type of content at a point in time at which the content switching event is detected,
determine a target location corresponding to the output location information in the second type of content, and
output the second type of content from the target location.

6. The electronic device of claim 1, wherein the instructions, when executed by the processor, further cause the processor to output the first type of content again based on another content switching event being detected.

7. The electronic device of claim 1,
wherein the first type of content is text content, and
wherein the second type of content is one of audio content or video content including audio.

8. The electronic device of claim 1,
wherein the first type of content is one of audio content or video content including audio, and
wherein the second type of content is text content.

9. An operating method of an electronic device, the operating method comprising:
in response to the electronic device detecting a content switching event, identifying content information on a first type of content that is output from the electronic device, while the electronic device outputs the first type of content, determining whether the content information includes information about a second type of content related to the first type of content, retrieving the second type of content related to the first type of content based on the content information in response to the content information including the information about the second type of content, and outputting the second type of content.

10. The operating method of claim 9, wherein the content switching event is detected through one or more sensors.

11. The operating method of claim 9,
wherein the content switching event is detected through a communicator configured to connect the electronic device to one or more external electronic devices, and
wherein the second type of content is output from the one or more external electronic devices.

12. The operating method of claim 9, wherein the retrieving comprises retrieving the second type of content from at least one of the content information or an external content providing server.

13. The operating method of claim 9, further comprising:
obtaining output location information of the first type of content at a point in time at which the content switching event is detected;
determining a target location corresponding to the output location information in the second type of content; and
outputting the second type of content from the target location.

14. The operating method of claim 9, further comprising outputting the first type of content again based on another content switching event being detected.

15. The operating method of claim 9,
wherein the first type of content is text content, and
wherein the second type of content is one of audio content or video content including audio.

16. The operating method of claim 9,
wherein the first type of content is one of audio content or video content including audio, and
wherein the second type of content is text content.

17. A non-transitory recording medium storing a program for controlling an operation of an electronic device, the program, when executed by a processor of the electronic device, causes the electronic device to perform:
in response to a content switching event being detected in the electronic device, identifying content information on a first type of content that is output from the electronic device, while the electronic device outputs the first type of content, determining whether the content information includes information about a second type of content related to the first type of content, retrieving the second type of content related to the first type of content based on the content information in response to the content information including the information about the second type of content, and outputting the second type of content.

18. The non-transitory recording medium of claim 17, wherein the program, when executed by the processor, causes the electronic device to further perform:
obtaining output location information of the first type of content at a point in time at which the content switching event is detected;
determining a target location corresponding to the output location information in the second type of content; and
outputting the second type of content from the target location.

19. The non-transitory recording medium of claim 17, wherein the first type of content is text content, and
wherein the second type of content is one of audio content or video content including audio.

20. The non-transitory recording medium of claim 17, wherein the first type of content is one of audio content or video content including audio, and
wherein the second type of content is text content.

21. The non-transitory recording medium of claim 17, wherein the content switching event comprises one of an event in which a user switches from a state of being able to concentrate on text to a state in which the user is unable to concentrate on text or an event in which the user switches from the state of being unable to concentrate on text to the state of being able to concentrate on text.

22. The non-transitory recording medium of claim 21, wherein the program, when executed by the processor, causes the electronic device to further perform:
based on the electronic device detecting at least one of the user beginning to gaze at a screen, the screen being turned on, or the electronic device stops moving, determining that the user is in the state of being able to concentrate on text; and
based on the electronic device detecting at least one of the user stops gazing at a screen, the screen being turned off, or the electronic device beginning to move, determining that the user is in the state of being unable to concentrate on text.

23. The non-transitory recording medium of claim 18, wherein, based on the content switching event comprising a connection event to one or more external electronic devices, outputting the second type of content through the one or more external electronic devices.

* * * * *